June 27, 1939.  R. G. HANDY  2,163,997
CARBURETOR CONTROLLING DEVICE
Filed Aug. 15, 1935   2 Sheets-Sheet 1
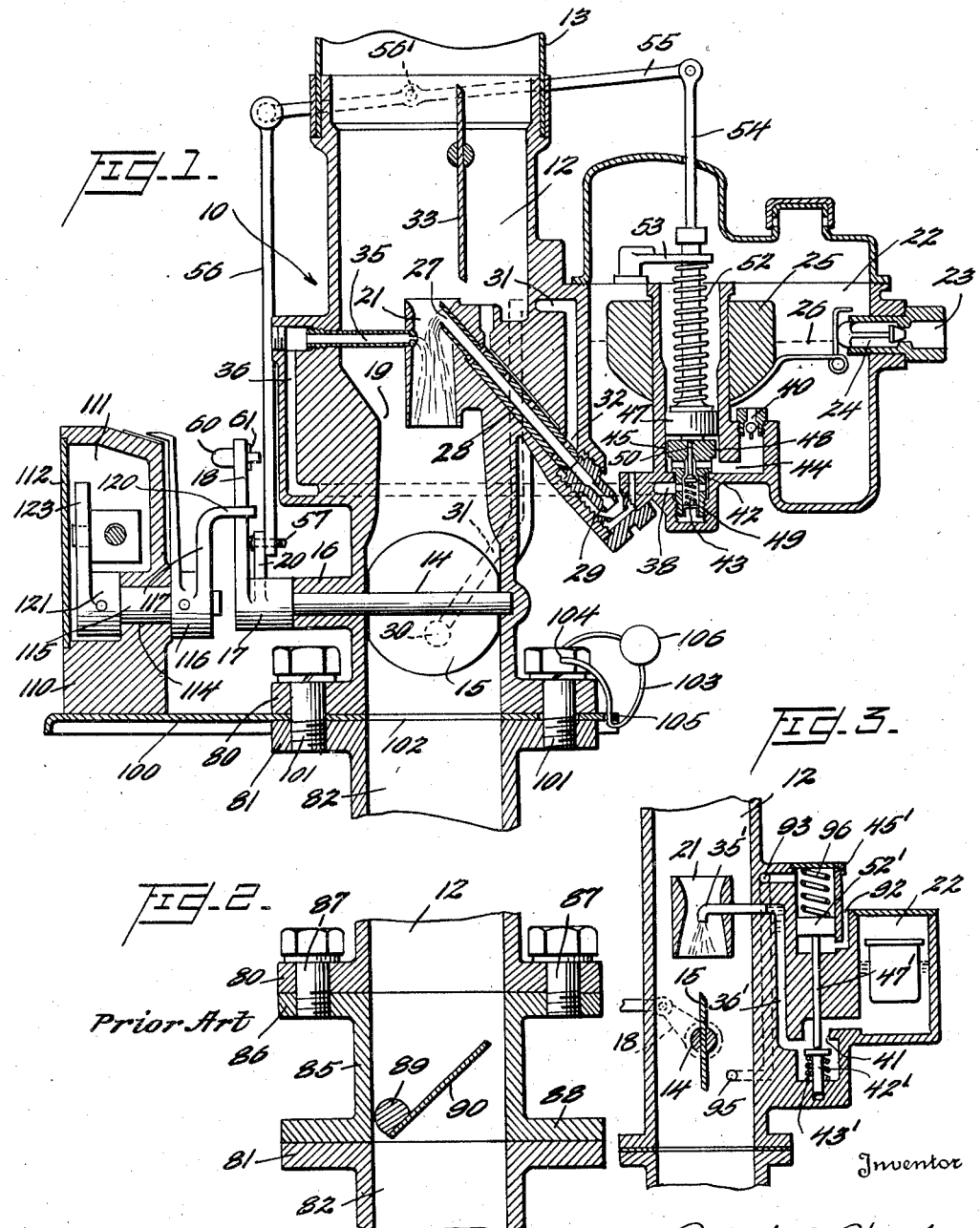
Inventor
Robert G. Handy
By Watson, Coit, Morse & Grindle
Attorney

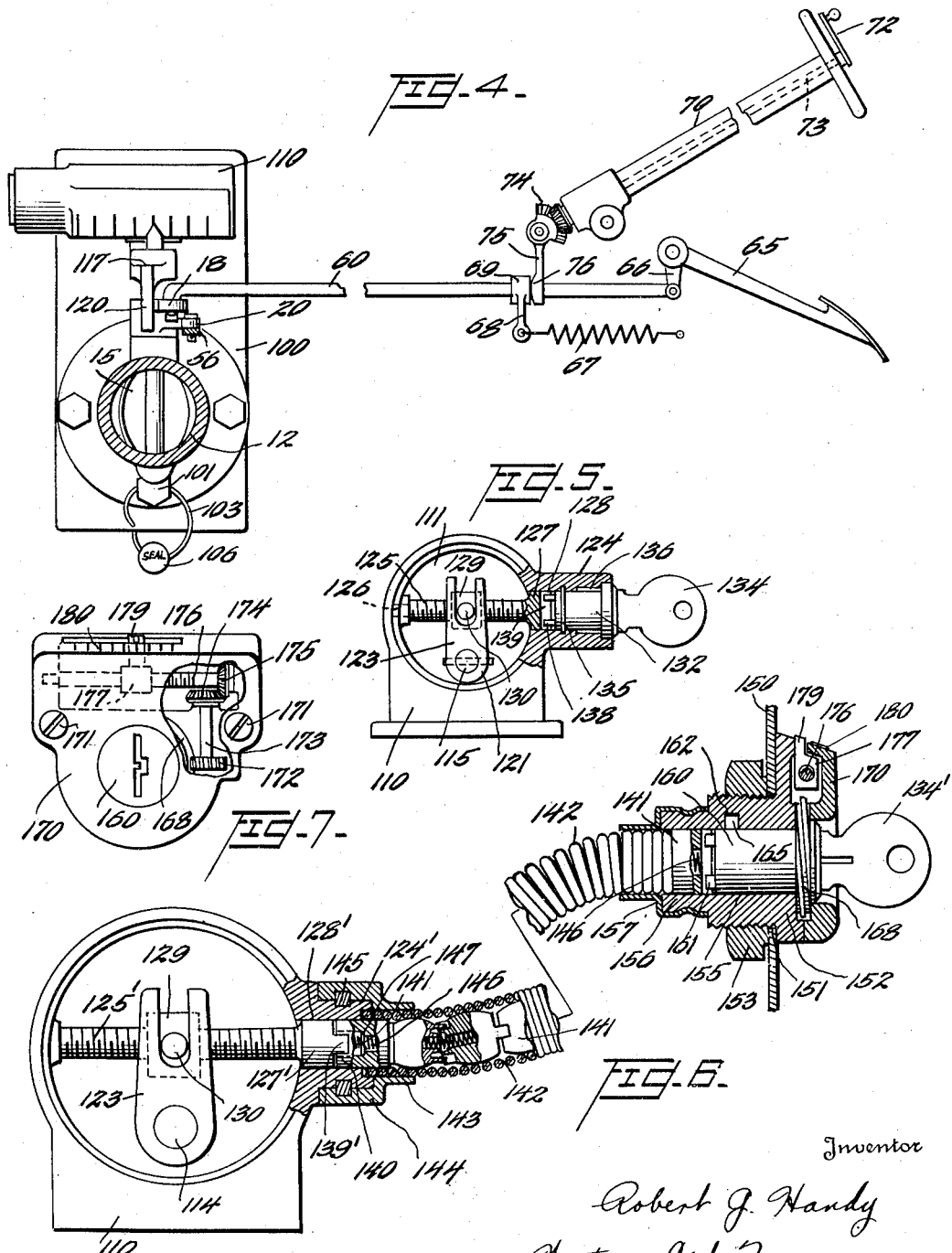

Patented June 27, 1939

2,163,997

UNITED STATES PATENT OFFICE 2,163,997

CARBURETOR CONTROLLING DEVICE

Robert G. Handy, Detroit, Mich.

Application August 15, 1935, Serial No. 36,395

8 Claims. (Cl. 137—139)

This invention relates to throttle controlling devices and more particularly to devices of this character adapted for use in connection with the throttle valve and other actuating mechanism associated with the carburetors of internal combustion engines, and designed to limit the extent of operative movement of these mechanisms and thus to govern the power and speed of the engine and through it the movements of the driven mechanism, for example, the motor vehicle in which said internal combustion engine may be installed.

The general object of the invention is to provide a novel and improved device of the type described.

Numerous proposals have been made with the object in view of limiting the maximum speed of motor vehicles. This purpose has been motivated, in the case of both trucks and passenger types, from two main standpoints, namely, (1) fuel economy and (2) safety.

It is probably natural that operators of large fleets of trucks or commercial vehicles should have been more concerned in the past about the attainment of the first mentioned objective than individual operators of passenger vehicles. However, the same principles governing the relations of the speed of vehicles to the fuel economy apply equally well in the case of passenger vehicles as in the case of trucks. Recent experiments and tests conducted by a large automobile manufacturer show conclusively that as speeds are increased, the horsepower developed by the engine must be greatly increased. The following data was obtained as the result of certain of these experiments. In the first column is given a series of numbers representing the speed of a motor vehicle in miles per hour and in the second column the corresponding horsepower developed by the engine to attain these speeds is shown:

| Miles per hour | Horsepower |
|---|---|
| 20 | 4.5 |
| 30 | 9 |
| 40 | 17.5 |
| 50 | 31.5 |
| 60 | 50 |
| 70 | 72 |
| 73 | 82 |

A significant point which was revealed by these experiments is that it requires about ten additional horsepower to increase the speed of a six cylinder car about three miles per hour when it is running about seventy miles per hour.

A corollary to these data is shown in the following table from which it is very evident that gasoline economy (miles per gallon) drops rapidly as speeds are increased, thus causing higher costs of operation. The tests which revealed the following information were conducted at constant speeds with a fixed throttle on cars consuming about twenty miles per gallon at twenty miles per hour and indicates very clearly how the normal economy of the car will vary under different driving conditions.

| Miles per hour | Miles per gallon |
|---|---|
| 20 | 20.0 |
| 30 | 19.7 |
| 40 | 18.3 |
| 50 | 15.9 |
| 60 | 12.2 |
| 70 | 8.0 |

These data demonstrate clearly why operators of large fleets of motor cars desire some means to prevent these cars being driven at high speeds when so little mileage is obtained from a gallon of gasoline.

From the standpoint of safety there is much to be said in favor of limiting speeds of vehicles, and this comment applies more particularly to modern passenger vehicles than to commercial automobiles and trucks.

It is not generally recognized that the highway systems of the country were designed for travel at rates of speed under forty or forty-five miles an hour. This was the maximum possible speed a few years ago. Then over a period of years the maximum speed of motor vehicles gradually rose to about fifty-five or sixty miles per hour which was a fairly small increase, and due to the period of time over which this development took place, the driving public became used to it and then, too, many of the highways of the country were improved accordingly.

However, recent years have witnessed a very great increase in speeds of automobiles. It took almost twenty years to increase the road speed of the average car from thirty to sixty miles per hour, but in the short space of about two years the maximum speed has been increased from sixty to eighty-five and even ninety miles an hour. Furthermore, whereas it is comparatively easy to become accustomed to a thirty mile per hour increase in speed from thirty to sixty miles an hour, it is very difficult for drivers to become educated to a proper appreciation of a thirty mile increase in the range from sixty to ninety miles per hour. Even in the case of a skilled operator driving on a road constructed for the accommodation of vehicles travelling at such high speeds, the operation of the vehicle at such speeds induces a mental fatigue which continues for some time even though the speed may be subsequently reduced.

In view of the serious situation which has arisen from these circumstances, it is but natural that proposals looking toward the limitation of excessive speeds have become frequent. Most prior attempts to limit the maximum speed obtainable by motor vehicles have involved the use of governors of various types, all of which have employed auxiliary valves in the intake manifolds of the engines in addition to the usual throttle valves. These expedients, even though they effect a limitation of speed, have not proved satisfactory from the standpoint of economy. To appreciate the functioning of my invention in this respect, it is necessary to understand some of the features of modern carburetors.

In the usual carburetor construction, gasoline is introduced into the inspirated air by four means: (1) the idling jet; (2) the main metering jet; (3) the economizer jet; and (4) the accelerator pump. The last two means cited may be actuated or placed in active service either by mechanical means or by means of the vacuum existing in certain points in the manifold.

The idle jet is used to permit gasoline to be drawn into the manifold when the carburetor throttle valve is in the closed or very nearly closed position; functioning alone when the engine is turning over at a slow speed without load as it does when the vehicle is stationary.

The main metering jet supplies gasoline to the inspirated air at all speeds above the very slow speed determined by the position of the throttle valve which places the idle jet in action. Formerly the equivalent of the present main metering jet was all that was required to supply the gasoline to the inspirated air since at that period of automotive development the engines were of slow speed, low power, and slow acceleration. With this construction the ordinary type of governor sufficed to limit the speed of the cars, since the movement of any valve inserted between the carburetor and the cylinders of the engine had no different effect upon the quality of the mixture than the same variation or restriction by the carburetor throttle valve itself.

However, with the great increase in speeds of vehicles, the much greater power developed, the greater variation in engine speed for increased flexibility, the demand for more rapid acceleration and at the same time the effort to attain a maximum of economy, all influenced the design of carburetors. This is manifested in the provision of separate means for metering additional quantities of gasoline into the air stream over that supplied by the main metering jet alone. It will be obvious from subsequent descriptions that the ordinary governor cannot effectively control these additional gasoline supplying means even though they work satisfactorily in connection with carburetors employing only idle jets and single metering jets.

It is therefore an important object of the present invention to provide means which will not only limit the maximum speeds attainable by the internal combustion engine to which they are applied but will also control the functioning of the economizer jet and accelerator pump to effect additional fuel economy and prevent occurrence of improper mixtures even though the total amount of vaporized fuel supplied to the engine is limited.

My invention also contemplates the provision of means which may be locked in any selected one of a multiplicity of positions in the path of a portion of the control linkage which actuates the throttle valve of the carburetor and which is also adapted to bring into operation the economizer jet or the accelerator pump, or both if both of these instrumentalities are provided.

Further objects of the invention include the provision of indicating mechanism associated with the stop device and also means for controlling the latter from a remote point. Another novel feature includes the multiplying mechanism which provides a relatively small travel of the limiting member upon a rather large movement of the locking means, whereby finer adjustments of the device may be obtained.

Other objects and features of novelty will be apparent from the following specification when read in connection with the accompanying drawings in which certain embodiments of my invention are illustrated by way of example.

In the drawings:

Figure 1 is a more or less diagrammatic view in vertical section of a typical carburetor to which a device embodying the principles of my invention is attached;

Figure 2 is a fragmentary vertical sectional view of a governor valve of the type generally employed, which when viewed in relation to certain portions of Figure 1 shows clearly the relative positions of this valve with respect to the main throttle valve and auxiliary jets described herein;

Figure 3 is a fragmentary vertical cross sectional view of a modified form of carburetor employing a vacuum operated economizer jet, and showing the functioning of my novel limiting means in connection therewith;

Figure 4 is a view in horizontal cross section of the carburetor manifold, showing my improved limiting device in plan and certain of the usual motor vehicle controlling means in diagram;

Figure 5 is a view in side elevation of my device with a portion of the mechanism shown in cross section;

Figure 6 is a view similar to Figure 5 but illustrating in vertical cross section the locking means disposed at a point remote from the limiting device; and Figure 7 is a front view of the remote control locking means shown in Figure 6, a portion being shown in cross section.

Referring now to Figure 1 of the drawings, it will be seen that the reference numeral 10 designates generally a carburetor embodying many of the features to which reference has been made and having my improved limiting means applied thereto. The carburetor 10 comprises a conduit or manifold section 12 through which the mixed air and gasoline is aspirated. The arrangement illustrated is of the down-draft type, but it will be understood that my invention is applicable to other types of installations as well. At the top of the conduit 12 a portion of the intake member 13 which may be provided with an air filter, is shown and near the bottom of the conduit 12 there is provided a transverse shaft 14 which carries the usual throttle valve 15 of the butterfly type. The shaft 14 extends through the boss 16 upon one side of the conduit and is provided with a head 17 which carries a pair of arms 18 and 20, the operative connections of which will be presently described. At an intermediate point in the conduit or manifold 12 there is provided the large venturi 19 and the auxiliary venturi 21 which comprises a tubular section projecting from the wall of the conduit 12. A choke valve is shown at 33 in the upper portion of the conduit 12.

The usual float chamber is indicated at 22 and is adapted to receive its supply of gasoline through the intake 23 in which is positioned the valve 24 controlled by the float 25, the normal level of the liquid fuel being indicated at 26.

Projecting into the auxiliary Venturi passageway 21 is shown the main metering jet 27 which comprises a tubular member 28 provided with suitable and conventional adjustable fittings 29 through which the fuel from the chamber 22 is adapted to pass. The various features of this jet, as of certain other of the elements described, are conventional and will not be set forth in detail herein. The idle jet orifice is indicated at 30 and is supplied with fuel through the conduit 31 which leads from a point 32 adjacent the main metering jet tube 28. It will be noted that the idle jet 30 occupies a position below the point of closure of the main throttle valve 15 which is, of course, necessary to provide the proper idling flow when the throttle valve is nearly closed.

Projecting into the venturi 21 there is also found the economizer jet 35 which in this case serves also to provide means for injecting additional fluid supplied by the accelerator pump. This jet 35 is fed by a passageway 36 which leads from a point 38 in the base of the casing forming the float chamber 22. Between the outlet point 38 and the interior of the float chamber 22 there are provided two valves, a check valve 40 and a valve 42 which is urged upwardly against its seat by means of the coil spring 43. Between the two valves there is disposed a pump inlet chamber 44 and a cylindrical chamber 45 within which the accelerator pump piston 47 reciprocates. For convenience, the valve 42 and spring 43 are carried by the fitting 48 which is threaded as at 49 within the carburetor casing. The valve 42 is provided with a stem 50 which is guided within the fitting 48. The pump piston 47 is urged downwardly within the cylindrical chamber 45 by means of the coil spring 52 which is adapted to be compressed between the head of the piston 47 and the bracket 53 secured to the carburetor casing. The stem 54 of the piston is generally attached to the piston 47 by means of a lost-motion connection, extends upwardly through the casing, and is pivotally connected with a lever 55 which is fulcrumed as at 56' upon a stationary portion of the carburetor structure and is in turn pivotally connected at its opposite end with a vertical link 56. The link 56 is pivotally connected as at 57 with the rocker arm 20 connected with the throttle valve shaft 14. Suitable actuation linkage is provided which includes the arm 60 pivotally connected as at 61 with the end of the actuating crank arm 18 of the throttle valve and associated mechanism. As shown in Figure 4 of the drawings, this arm or shaft 60 is operatively connected with the accelerator pedal 65 by means of the arm 66. A coil spring 67 connected with an arm 68 rigidly secured to the shaft 60 by means of the sleeve 69 tends to hold the mechanism in released or throttle closed position.

Upon the steering column, indicated diagrammatically at 70, there is carried the hand throttle 72 which is attached to the end of the shaft 73 which is geared as at 74 with the pivoted arm 75 which presses as at 76 against the abutment sleeve 69 which carries the arm 68. It will be understood that these conventional elements are shown merely diagrammatically and will serve to represent any conventional arrangement for actuating the throttle and associated accelerating and high speed operating devices.

The operation of the accelerator pump and economizer jet is as follows. When the throttle valve 15 is closed, the accelerator pump 47 moves to an upper position in the cylindrical chamber 45 and the position of the connecting linkage is correspondingly altered. This causes an influx of liquid fuel through the check valve 40 into the intake chamber 44 and the cylindrical pump chamber 45. Upon actuation of the accelerator pedal 65 or the hand throttle arm 72, the crank arm 18 will be rotated toward the left in Figure 4 and toward the observer in Figure 1. This will cause the butterfly throttle valve 15 to open and through the linkage 20, 56, 55, 54, will permit the piston 47 to descend under the influence of spring 52, forcing the fuel through the valve assembly 42, 48 against the pressure of the spring 43, and causing an injection of gasoline through the economizer nozzle or jet 35 into the venturi 21. This additional supply of gasoline occurs whenever the throttle actuating means are actuated and serves to increase the rate of acceleration of the car. In increasing the speed the piston 47 moves downwardly within its cylinder and, in many carburetors when a speed of approximately seventy miles per hour is reached, the end of the piston contacts with the stem 50 of the valve 42 and unseats this valve, thus permitting additional fuel to flow through the economizer jet 35 and providing a richer mixture for attaining maximum power at these high speeds. Although the accelerator pump and the economizer jet actuating means are combined in this embodiment, it will be understood that only one of these elements may be found in certain carburetors.

At the lower end of the conduit or carburetor manifold 12 there is provided a flange 80 whereby it may be connected to the intake manifold 82 which has a cooperating flange 81. In Figure 2, which illustrates the use of a governor in accordance with the prior art, there is inserted between the carburetor conduit 12 and the intake manifold 82 a short conduit section 85 which has a flange 86 connected to the flange 80 by means of the bolts 87 and each bottom flange 88 is similarly connected to the flanges 81 of the intake manifold. Pivotally mounted in this conduit section 85 is the governor valve shaft 89 to which the governor valve 90 is secured. The shaft 89 is adapted to be rotated by the conventional governor mechanism to regulate the degree of opening of the governor valve 90 and thus to control the flow of combustible mixture from the carburetor to the cylinders at a point beyond the throttle valve 15.

The disadvantages of this arrangement will be manifest. Let us assume that the governor is used to control the speed of the engine and the governor valve 90 is set in such a position that the speed of the vehicle is limited to about forty miles an hour and the carburetor throttle valve 15 is closed. The operator, desiring to speed up to the limit set by the valve 90, will open the carburetor throttle valve 15 wide by actuating the accelerator operating means to its limit. The governor valve 90 limits the speed of the car, but the linkage 54 causes the piston 47 to descend far enough to open the economizer valve 42 and release through the jet 35 a quantity of gasoline into the air stream in excess of that required for a satisfactory and economical quality of mixture at the speed determined by the position of the governor valve 90. On the contrary, if the carburetor throttle valve 15 was opened only so far as to give the speed determined by the opening of the auxiliary governor valve 90, the supply of surplus gasoline through the valve 42 and the economizer jet 35 would be prevented and gasoline waste from this source eliminated. This my invention serves to accomplish, as will be understood as the detailed description proceeds.

The effect of a governor valve such as illustrated at 90 in connection with the mechanically operated accelerating pump 47 will now be explained. Assuming that the governor valve 90 is set to establish a maximum speed of say forty miles an hour, the driver is free to move the carburetor throttle valve 15 over its entire range and, especially in city driving, he is constantly doing so. The natural instinct, when a lower speed is desired, is to fully remove the foot from the accelerator pedal, and then as conditions warrant, to depress it to the speed desired. If the driver knows that an auxiliary governing valve such as 90 will determine his maximum speed, he will depress the accelerator pedal the full extent and permit the governor valve to assume the burden of setting the speed of the car. Every movement of the throttle valve ultimately effects a movement of the accelerator piston 47 which, in turn, ejects gasoline through the jet 35; and, the throttle valve 15 being free to move over its entire range, the pump 47 injects the fuel into the air stream in amounts in excess of the requirements to attain the desired speed. The devices constructed in accordance with my invention will eliminate this disadvantage by effecting a direct limiting control over both the throttle valve and the accelerator pump.

In Figure 3 there is diagrammatically illustrated a carburetor which employs a vacuum operated economizer jet. Only those portions of the mechanism are illustrated which are applicable to the explanation being developed. The air conduit 12 is shown as is also the small venturi 21. The throttle valve 15 is also indicated, together with its operating crank arm 18. The float chamber 22 is connected with an economizer jet 35' by means of the passageway 36' which is provided with a valve 42', which is normally urged toward its seat 41 by means of the spring 43'. A rod 47' provided with a piston 52' at its upper end projects through the carburetor casing so as to contact at times with the valve 42' and remove it from its seat 41. The piston 52' moves in a cylindrical chamber 45' the lower end of which is in communication with the atmosphere through the passageway 92. Another passageway 93 connects the upper end of the chamber 45' with the lower end of the air conduit or manifold 12 at 95, which point is just below the point at which the throttle valve 15 closes the conduit 12. The piston 52' together with the rod 47' is urged downwardly by the coil spring 96.

The normal operation of this arrangement is as follows. When the throttle valve 15 in this embodiment is moved from closed to opened position the vacuum existing in the inlet manifold drops, being greatest when valve 15 is closed and lowest when this valve is wide open. By the proper proportion of the strengths of the springs 96 and 43' and the area of the piston 52', the valve 42' can be made to open at any desired degree of vacuum in the inlet manifold. This effect is obtained by the differential of pressure established between the atmospheric pressure below the piston 52' and the pressure within the chamber 45' above the piston 52'. Now assume that an auxiliary governing valve is introduced between the carburetor and the inlet manifold as indicated at 90 in Figure 2 and is set at the desired limiting opening with the throttle valve 15 closed. If the driver desires to have the engine operate at the speed determined by the governor valve 90, he will open the throttle valve 15 to the wide open position shown in Figure 3. But now the governor valve 90 is the effective barrier which establishes the inlet manifold vacuum, this valve having inlet manifold vacuum on its lower side and nearly atmospheric pressure above it. Port 95 in these conditions is under practically atmospheric pressure; the pressure on the upper side of the piston 52' is also at atmospheric; and therefore the economizer valve operating piston 52' will be forced downwardly by the spring 96 and open the valve 42, admitting gasoline through the economizer jet 35'. This extra gasoline in unnecessary under the limiting conditions of speed existing and creates too rich a mixture resulting in useless fuel expenditure, loss of power, and the depositing of soot in the combustion chambers. Here again it will be seen that a positive stop operating on the throttle valve controlling linkage as in the case of my invention would eliminate the waste and other disadvantages caused by the employment of a governor valve between the carburetor and the engine.

Similar disadvantages exist in connection with the use of a governor with a carburetor having a vacuum operated accelerating pump. This type has not been illustrated in the drawings, but the operation is well known and is similar to certain of the mechanism already described.

The details of my limiting device and its operation will now be set forth. Instead of inserting the conduit section 85 carrying the governor valve 90 between the flanges 80 and 81 of the carburetor and inlet manifold respectively as shown in Figure 2, a plate-like bracket or platform 100 is clamped between these abutting flanges by means of the bolts 101. The bracket 100 is provided with an opening 102 which registers with the fuel conduit 12 of the carburetor and that of the inlet manifold 82. One or more of the bolts 100 is provided with a seal as indicated in Figure 1, the wire 103 of the seal passing through a hole 104 in the head of the bolt and through another hole 105 in an edge of the bracket 100, the ends of the wire being connected together by suitable sealing means 106. This is to prevent unauthorized removal of the attachment from the engine assembly.

Upon a projecting portion of the bracket 100 there is rigidly carried a casing 110 which is provided with a chamber 111 containing certain adjusting mechanism to be presently described. The chamber 111 is securely closed by means of the cover plate 112. The casing 110 is provided with a cylindrical bearing opening 114 through which the rock shaft 115 projects. Upon the outer end of the rock shaft 115 is rigidly secured the sleeve 116 which carries an arm 117 having a portion 120 which projects in the path of arm 75

18 when the latter is moving to throttle valve opening position. Upon the inner end of the rock shaft 115 a sleeve 121 is securely attached, this sleeve being formed with a bifurcated arm 123.

The upper portion of the casing 110 is preferably substantially cylindrical and projecting from one side thereof is the hollow boss 124. A screw shaft 125 is rotatably mounted in the chamber 111, one of its ends being seated in an interior bearing 126 and the other end of the screw shaft being provided with a head 127 which is adapted to rotate in the cylindrical bore 128 of the boss 124. Threaded upon the screw shaft 125 is a nut 129 which is provided with a stud 130, this stud being received between the bifurcations of the arm 123. It will be seen that rotation of the screw shaft 125 will cause the nut to travel along the shaft and through the connections just described, the shaft 115 will rock, causing the arm 117 and the stop portion 120 to move in an arc in the path of the throttle operating arm 18. It will be understood that instead of the screw and nut gearing just described, other forms of irreversible transmission mechanism may be employed. Thus the stop member 120 may be positioned at any desired point in the path of the crank arm 18 to limit the movement of the latter in opening the throttle and also in actuating the supplemental or auxiliary fuel supplying mechanisms operated either through the linkage 54—56 or through vacuum means affected by the throttle valve 15 itself.

In order to set the limiting means in the desired position so that it cannot be moved without authorization, the following locking means may be provided. Within the bore 128 of the boss 124 on the casing 110 there is provided a tumbler locking cylinder 132. This cylinder may be of any well known type and is adapted to be released and rotated by means of the removable key 134. A crescent ring 135 serves to retain the cylinder within the boss 124 and an annular series of slots 136 is provided upon the inner surface of the bore 128, within selected ones of which the tumblers of the locking cylinder may catch when the key 134 is removed. Upon the inner end of the lock cylinder 132 are provided projections 138 which are adapted to enter the slot 139 in the head 127 of the screw shaft. It will thus be seen that upon insertion of the key 134 the tumblers are withdrawn from the slots 136 and the lock cylinder 132 may be rotated thus causing the screw shaft 125 to turn. When the stop member is moved to the desired position the key 134 may be removed and the lock cylinder 132 will then be rigidly held against rotation.

In Figure 6 of the drawings there is illustrated a modification by which the actuation of the limiting means may be accomplished from a point remote from the carburetor attachment. The casing 110 in this embodiment is provided with a boss 124' within the cylindrical bore 128' of which is rotatably mounted the head 127' of the screw shaft 125'. The head 127' is provided with a squared coupling projection 139' which is adapted to interlock with similar projections 140 formed on the member 141. This member is the first of a series of elements providing a flexible drive shaft housed within the coil spring 142. A smaller coil spring 146 passes through openings in the centers of the elements 141 and is retained at the ends of the flexible drive shaft by means of the small split washers 147. This spring is placed under slight tension when the device is assembled, in order to ensure that the driving elements 141 are maintained in interlocking engagement at all times. The encasing coils 142 are received within the nipple 143 formed on the sleeve 144 which is keyed as at 145 to the boss 124'.

The flexible shaft connection 141, 142 may be extended to any desired point within convenient reach of the operator of the engine or the vehicle. In this embodiment the shafting is carried to the vicinity of the instrument panel 150, within an opening 151 of which is positioned the bracket 152 which is rigidly secured in place by means of the nut 153. The bracket member 152 is provided with a cylindrical bore 155 and a nipple 156. One end of the chain of flexibly connected members 141 is received within the bore 155 and the enveloping casing 142 is connected therewith as by means of the compressed sleeve 157, which renders the drive tamper-proof. A lock cylinder 160 is rotatably mounted within the bore 155 and is interlocked with the end member 141 by means of the cooperating projections 161. A series of recesses 162 is provided around the bore 155 for the selective reception of the lock bolt or tumbler 165 which is adapted to be projected and retracted by the insertion of the key 134'.

In order to retain the lock cylinder 160 within the bracket or casing 152 a flange 168 is secured to the cylinder and is adapted to be retained between the main portion of the casing 152 and the cover plate 170 which is attached thereto as by means of the fastening elements 171. This flange 168 also serves as part of the drive for an indicating means which will now be described. The periphery of the flange 168 is provided with worm teeth which are adapted to mesh with the gear 172 which is mounted upon the shaft 173 carried in the casing 152, 170. On the upper end of the shaft 173 is carried the bevel gear 174 which meshes with a bevel gear 175 carried by the transverse screw shaft 176 carried in suitable bearings in the casing. A travelling nut 177 is threaded upon the screw shaft 176 and is provided with a pointer 179 which moves along the graduations 180 on an upper surface of the casing.

The operation of this embodiment will be readily apparent. Upon insertion of the key 134' within the lock cylinder 160 the bolt 165 is withdrawn from its notch 162 and the cylinder 160 may be rotated, whereupon through the flexible drive shaft 141, 142 the mechanism within the casing 110 will be driven to actuate the stop member 120 in precisely the same way as described in connection with the other embodiment. When the cylinder 160 is rotated, the worm upon the flange 168 will drive the gearing 172—176, thus moving the nut 177 along the graduations 180 which may represent the maximum settings of the carburetor expressed in miles per hour.

It will be understood that by means of the present invention there has been provided a novel and very effective limiting device for internal combustion engines which may readily be applied to automotive vehicles to establish the maximum permitted speed thereof without giving rise to uneconomical mixtures, faulty combustion and waste of fuel as in the case of the governor type of limiting mechanism.

It will be understood that various changes and modifications may be made in the devices illustrated and described herein without departing from the scope of the invention as determined by the following claims.

Having thus described the invention, what is claimed as new and desired to be secured by Letters Patent is:

1. A device for use in connection with a throttle valve and actuating mechanism for said valve, for predetermining maximum limits to which said throttle valve may be opened, comprising, in combination, a movable stop member supported adjacent said actuating mechanism and disposable at a multiplicity of points in the path of movement of a portion of said mechanism in the direction to open the throttle valve, and means for moving said stop member to any of said points selected and preventing further movement of said mechanism in said direction, said means comprising a tumbler lock cylinder and means operatively connecting said cylinder and said member, said last named means comprising a screw rotatable by said cylinder, a nut threaded upon and adapted to travel along said screw, and an operative connection between said nut and said member.

2. A device for use in connection with a throttle valve and actuating mechanism for said valve, for predetermining maximum limits to which said throttle valve may be opened, comprising, in combination, a movable stop arm supported upon a rock shaft adjacent said actuating mechanism and disposable at a multiplicity of points in the path of movement of a portion of said mechanism in the direction to open the throttle valve, and means for moving said stop arm to any of said points selected and preventing further movement of said mechanism in said direction, said means comprising a tumbler lock cylinder and means operatively connecting said cylinder and said arm, said last named means comprising a screw rotatable by said cylinder, a nut threaded upon and adapted to travel along said screw, and another arm on said rock shaft pivotally connected with said nut.

3. A device for use in connection with a throttle valve and actuating mechanism for said valve, for adjustably establishing maximum limits to which said throttle valve may be opened, comprising, in combination, a movable stop arm supported upon a rock shaft adjacent said actuating mechanism and disposible at a multiplicity of points in the path of movement of a portion of said mechanism in the direction to open the throttle valve, and means for moving said stop arm to any of said points selected and preventing further movement of said mechanism in said direction, said means comprising a tumbler lock cylinder and means operatively connecting said cylinder and said arm, said last named means comprising a screw rotatable by said cylinder, a nut threaded upon and adapted to travel along said screw, a bifurcated arm on said rock shaft and a projection on said nut received between the bifurcations of said arm.

4. For use in connection with a fuel intake manifold including abutting flanged sections, the flanges of the adjacent sections being secured together by suitable fastening elements, a throttle valve controlling the flow through said manifold and suitable actuating mechanism for said valve, a device for predetermining maximum limits to which said throttle valve may be opened, comprising a perforated plate-like bracket clamped between said flanges of said manifold sections, a perforation in said bracket permitting passage of fluid through said manifold, a casing secured to said bracket, a movable stop member projecting from said casing and disposable at a multiplicity of points in the path of valve opening movement of a portion of said actuating mechanism, means within said casing for moving said member, and a locking operating device for said means.

5. For use in connection with a fuel intake manifold including abutting flanged sections, the flanges of the adjacent sections being secured together by suitable fastening elements, a throttle valve controlling the flow through said manifold and suitable actuating mechanism for said valve, a device for predetermining maximum limits to which said throttle valve may be opened, comprising a perforated plate-like bracket clamped between said flanges of said manifold sections, a perforation in said bracket permitting passage of fluid through said manifold, said fastening elements passing also through said interposed bracket, sealing means preventing unauthorized removal of said elements, a casing secured to said bracket, a movable stop member projecting from said casing and disposable at a multiplicity of points in the path of valve opening movement of a portion of said actuating mechanism, means within said casing for moving said member, and a locking operating device for said means.

6. For use in connection with a fuel intake manifold including abutting flanged sections, the flanges of the adjacent sections being secured together by suitable fastening elements, a throttle valve controlling the flow through said manifold and suitable actuating mechanism for said valve, a device for predetermining maximum limits to which said throttle valve may be opened, comprising a perforated plate-like bracket clamped between said flanges of said manifold sections, a perforation in said bracket permitting passage of fluid through said manifold, a casing secured to said bracket, a movable stop member projecting from said casing and disposable at a multiplicity of points in the path of valve opening movement of a portion of said actuating mechanism, a screw mounted for rotation within said casing, a nut threaded upon said screw and held from rotation, an operable connection between said nut and said member, and a lock cylinder rotatably secured within an opening in said casing and adapted to be locked thereto in any of a plurality of selective positions, said lock cylinder being operatively connected with said screw for rotating the same.

7. A device for use in connection with a throttle valve and actuating mechanism for said valve, for predetermining maximum limits to which said throttle valve may be opened, comprising, in combination, a casing supported adjacent said actuating mechanism, a rock shaft rotatably carried in a bearing opening in a wall of said casing, and having its ends projecting respectively into and out of said casing, a rock arm rigidly secured to the exteriorly projecting end of said shaft and disposable at a multiplicity of points in the path of throttle opening movement of a portion of said actuating mechanism, transmission mechanism disposed within said casing for rocking said shaft and operating means for said transmission mechanism, said transmission mechanism comprising a screw rotatable by said operating means, a nut threaded upon and adapted to travel along said screw, a bifurcated arm on said rock shaft, and a projection on said nut received between the bifurcations of said arm.

8. A device of the character described including in combination, a conduit having a throttle valve therein, a spindle carrying the valve and extending outside the conduit, an actuating arm secured to the spindle, a casing supported on the conduit having a rock shaft therein with a projecting end, a stop arm secured to said end having a portion in the path of said valve actuating arm adapted to limit the extent of movement of the valve arm in its opening direction, means to turn said shaft to adjust the stop arm and its portion to any one of a multiplicity of positions in the path of said valve arm and means to lock the stop arm against tampering by unauthorized persons.

ROBERT G. HANDY.